(12) United States Patent
Zhang et al.

(10) Patent No.: US 11,449,530 B2
(45) Date of Patent: Sep. 20, 2022

(54) DETERMINING ATTRIBUTE INFORMATION OF GEOGRAPHICAL LOCATIONS

(71) Applicant: Advanced New Technologies Co., Ltd., Grand Cayman (KY)

(72) Inventors: Qi Zhang, Hangzhou (CN); Dong Shen, Hangzhou (CN); Yinan Xu, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 583 days.

(21) Appl. No.: 16/131,540

(22) Filed: Sep. 14, 2018

(65) Prior Publication Data

US 2019/0012331 A1 Jan. 10, 2019

Related U.S. Application Data (63) Continuation of application No. PCT/CN2017/075518, filed on Mar. 3, 2017.

(30) Foreign Application Priority Data

Mar. 16, 2016 (CN) .......................... 201610149877.6

(51) Int. Cl.
*G06F 16/29* (2019.01)
*G06F 16/951* (2019.01)

(52) U.S. Cl.
CPC ............ *G06F 16/29* (2019.01); *G06F 16/951* (2019.01)

(58) Field of Classification Search
CPC ............................... G06F 16/29; G06F 16/951
See application file for complete search history.

(56) References Cited

U.S. PATENT DOCUMENTS 10,460,247 B2 * 10/2019 Swaminathan .......... G06N 5/04
2002/0188402 A1 12/2002 Huang et al.
(Continued)

FOREIGN PATENT DOCUMENTS

| CN | 1338720 | 3/2002 |
|---|---|---|
| CN | 1964270 | 5/2007 |

(Continued)

OTHER PUBLICATIONS

International Preliminary Report on Patentability in International Application No. PCT/CN2017/075518, dated Sep. 18, 2019, 9 pages (with English Translation).

(Continued)

*Primary Examiner* — William B Partridge
*Assistant Examiner* — Lana Alagic
(74) *Attorney, Agent, or Firm* — Fish & Richardson P.C.

(57) ABSTRACT

Attribute features associated with a geographical location are obtained at a terminal device, and the plurality of attribute features are determined based on geographical and residential information data of the geographical location that is collected from one or more remote devices. For each particular attribute feature, a score value and a weight value corresponding to the particular attribute feature are determined. An attribute value for the geographical location that corresponds to each particular attribute feature is calculated using the score value and the weight value corresponding to the particular attribute feature. Display of the attribute value is initiated using a graphical user interface on a computer display device.

18 Claims, 3 Drawing Sheets

(56) References Cited

U.S. PATENT DOCUMENTS

| | | | | |
|---|---|---|---|---|
| 2006/0100957 | A1* | 5/2006 | Buttler | G06Q 40/025 705/38 |
| 2006/0271417 | A1* | 11/2006 | Nguyen | G06Q 30/0205 705/7.34 |
| 2007/0135991 | A1 | 6/2007 | Riise et al. | |
| 2008/0243680 | A1* | 10/2008 | Megdal | G06Q 40/08 705/38 |
| 2010/0005346 | A1* | 1/2010 | Hamlescher | G06Q 10/06 714/57 |
| 2011/0313657 | A1* | 12/2011 | Myllymaki | G01C 21/3679 701/438 |
| 2012/0158748 | A1* | 6/2012 | Smintina | G06Q 30/0623 707/748 |
| 2016/0048934 | A1* | 2/2016 | Gross | G06K 9/4642 705/313 |

FOREIGN PATENT DOCUMENTS

| | | |
|---|---|---|
| CN | 103092879 | 5/2013 |
| CN | 103148857 | 6/2013 |
| CN | 103593349 | 2/2014 |
| CN | 104636482 | 5/2015 |
| EP | 2416290 | 2/2012 |
| JP | 2003295804 | 10/2003 |
| JP | 2009169173 | 7/2009 |
| JP | 2010186371 | 8/2010 |
| JP | 2013235527 | 11/2013 |
| KR | 20110102125 | 9/2011 |
| KR | 20120035600 | 4/2012 |
| KR | 20130059264 | 6/2013 |
| TW | 201015474 | 4/2010 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report by the International Searching Authority issued in International Application No. PCT/CN2017/075518 dated May 3, 2017; 10 pages.

Shim et al., "Web based entrepreneurship support system using GIS and UML," Proceeding of the Korean Information Processing Society Conference, May 2013, 20(1):925-927 (with English abstract).

* cited by examiner

DETERMINING ATTRIBUTE INFORMATION OF GEOGRAPHICAL LOCATIONS

CROSS-REFERENCE TO RELATED APPLICATIONS

This application is a continuation of PCT Application No. PCT/CN2017/075518, filed on Mar. 3, 2017, which claims priority to Chinese Patent Application No. 201610149877.6, filed on Mar. 16, 2016, and each application is hereby incorporated by reference in its entirety.

TECHNICAL FIELD

The present disclosure relates to the field of computer technologies, and in particular, to a method and device for determining attribute information of a geographical location.

BACKGROUND

Development of information technologies helps people query various geographical locations by using terminal devices such as a mobile phone or a tablet computer at anytime and anywhere.

In the existing technology, to make a travel more convenient, map navigation software provides a traffic density map. Different colors are marked for different areas, such as densely populated and sparsely populated areas, so that a user can determine, based on the density map, whether an area is densely populated.

However, it can be seen from the described process that the density map can only display population density instead of other attribute information of a geographical location, such as a level of prosperity, catering density, and entertainment density. If the user wants to obtain other attribute information of the area, the user needs to query other information. More operation steps mean less convenience for the user.

For example, if a tourist comes to Beijing, and wants to go to a prosperous commercial area in Beijing, the tourist queries geographical information of Beijing by using the map navigation software, but cannot obtain commercial area information of Beijing. The tourist identifies densely populated Huilongguan (a Taoist temple) in Changping District by using the traffic density map in the existing technology, but cannot determine whether the area is a prosperous commercial area. The tourist can only query, by using other methods, whether Huilongguan is a commercial area.

The user operation in the described process is relatively inconvenient.

SUMMARY

Implementations of the present application provide a method and device for determining attribute information of a geographical location, so as to resolve a problem in the existing technology that operation inconvenience arises when a user obtains attribute information of a geographical location.

An implementation of the present application provides a method for determining attribute information of a geographical location, including: obtaining a geographical feature of a geographical location from a navigation server; determining a behavior feature and a population feature of the geographical location based on pre-stored historical data; and determining attribute information of the geographical location based on at least one of the geographical feature, the behavior feature, and the population feature.

An implementation of the present application provides a device for determining attribute information of a geographical location, including: a first acquisition module, configured to obtain a geographical feature of a geographical location from a navigation server; a second acquisition module, configured to obtain a behavior feature and a population feature of the geographical location based on pre-stored historical data; and a determining module, configured to determine attribute information of the geographical location based on at least one of the geographical feature, the behavior feature, and the population feature.

The present application provides a method for determining attribute information of a geographical location. A geographical feature of a geographical location is obtained from a navigation server. A behavior feature and a population feature of the geographical location are determined based on pre-stored historical data. Attribute information of the geographical location is determined based on at least one of the geographical feature, the behavior feature, and the population feature. It can be seen from the described method that a user can directly obtain, after entering the geographical location, the attribute information of the geographical location without querying information about the geographical location, thereby effectively improving user operation convenience during geographical location querying.

BRIEF DESCRIPTION OF DRAWINGS

The accompanying drawings here are used to provide further understanding of the present application, and constitute a part of the present application. Example implementations of the present application and descriptions of the implementations are used to explain the present application, and do not constitute an improper limitation to the present application. In the accompanying drawings.

DESCRIPTION OF IMPLEMENTATIONS

To make the objectives, technical solutions, and advantages of the present application clearer, the following describes the technical solutions of the present application with reference to the specific implementations and the corresponding accompanying drawings of the present application. Apparently, the described implementations are some rather than all of the implementations of the present application. All other implementations obtained by a person of ordinary skill in the art based on the implementations of the present application without creative efforts shall fall within the protection scope of the present application.

Figure 1:
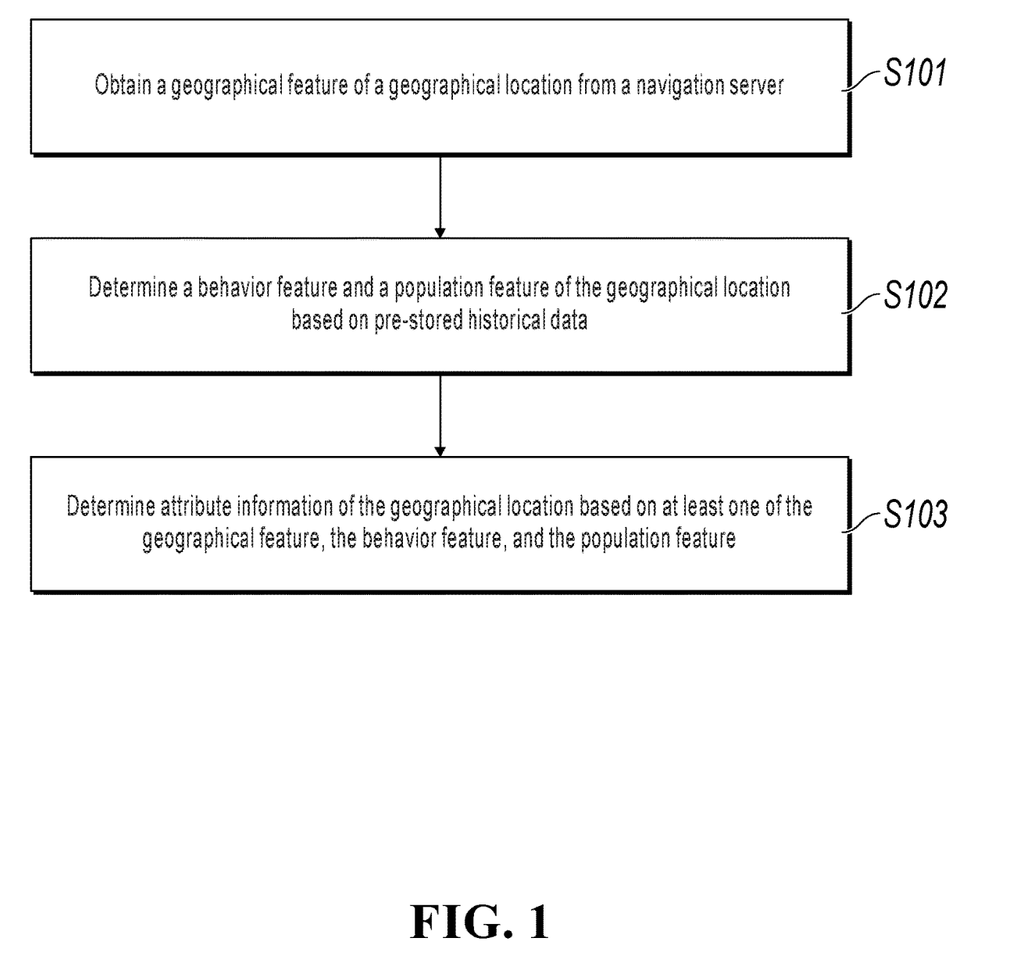
FIG. 1 illustrates a process of determining attribute information of a geographical location, according to an implementation of the present application.

FIG. 1 illustrates a process of determining attribute information of a geographical location, according to an implementation of the present application. The process includes the following steps.

S101. Obtain a geographical feature of a geographical location from a navigation server.

When a user wants to obtain attribute information of a certain geographical location, the user can first enter a name of the geographical location into a server or a terminal device, and the server or the terminal device can obtain a geographical feature of the geographical location. The geographical feature can include latitude, longitude, altitude or other metrics of the geographical location. Further, because a navigation service is widely used currently, the server can also obtain the geographical feature of the geographical location from the navigation server that provides the navigation service.

S102. Determine a behavior feature and a population feature of the geographical location based on pre-stored historical data.

In this implementation of the present application, in addition to the geographical feature, the attribute information of the geographical location further needs to be determined based on the behavior feature and the population feature of people in the geographical location. The behavior feature indicates various behavior and habit features of people in the geographical location, for example, a common consumption limit of people in a catering place or an entertainment place in the geographical location. The population feature is a feature of people in the geographical location, for example, gender distribution or age distribution.

S103. Determine attribute information of the geographical location based on at least one of the geographical feature, the behavior feature, and the population feature.

The attribute information of the geographical location can be determined based on at least one of the geographical feature, the behavior feature, and the population feature after the three features are determined. For example, a specified algorithm model can be pre-trained based on the three features and the attribute information to be determined. Therefore, the three features can be determined and directly entered into the pre-trained algorithm model, to obtain the output attribute information of the geographical location.

Alternatively, a score of each needed feature is obtained, and weighting calculation is eventually performed to obtain the attribute information of the geographical location. First, scores of the geographical feature, the behavior feature, and the population feature of the geographical location can be separately obtained. The scores can be obtained as follows: the server or the terminal device compares the three features of the geographical location with three corresponding features of other geographical locations, ranks these geographical locations based on a specific rule, and eventually obtains scores based on the ranks. Or the server or the terminal device can present the three features of the geographical location, and the staff voluntarily gives scores based on the three features.

Weights respectively corresponding to the geographical feature, the behavior feature, and the population feature of the geographical location can be determined after the scores of the three features are separately obtained, and then a weighting calculation is performed based on a score and a weight of each feature. A weighted sum is an attribute value of the geographical location. The attribute information of the geographical location can be determined based on the attribute value. The weight of each feature can be determined by using at least integrity, authenticity, and importance of the feature. In other words, the weight of each feature is determined by using an integrity weight, an authenticity weight, and an importance weight of the feature.

It can be seen from the described method that the user can directly obtain, after entering the geographical location, the attribute information of the geographical location without querying the attribute information of the geographical location in another method, thereby effectively improving user operation convenience during geographical location querying.

An example that the attribute information of the geographical location is commercial value is used below, to describe a detailed process of determining the commercial value of the geographical location.

First, a server configured to determine and provide the commercial value of the geographical location can obtain, from the navigation server, at least one of historical query frequency information of the geographical location, population distribution information of the geographical location, basic geographical information of the geographical location, and category information of the geographical location to serve as the geographical feature.

Then online information and offline information are obtained from a payment server to serve as the behavior feature. The online information includes, but is not limited to, historical payment information of the geographical location. The offline information includes, but is not limited to, historical offline transaction information of the geographical location and evaluation information of the geographical location.

Similarly, at least one of consumption feature information and age distribution information of users in the geographical location is obtained from the payment server to serve as the population feature.

Information included in the geographical feature, the behavior feature, and the population feature can be shown in Table 1.

TABLE 1

| Feature | Information included in the feature | Information example |
| --- | --- | --- |
| Geographical feature | Historical query frequency information of the geographical location | Frequency of searching, navigating, and querying geographical location A in a specific historical time period (for example, within past three years) by users |
| | Population distribution information of the geographical location | Population density distribution in geographical location A at different time points in a specific time period (for example, one day) |
| | Basic geographical information of the geographical location | Latitude and longitude information, altitude information, and information about most frequent weather of geographical location A |
| | Category information of the geographical location | Geographical location A is one of predetermined categories, such as a tourist attraction, a residential area, an office area, or a commercial area |
| Behavior feature | Historical payment information (online information) of the geographical location | Historical average usage amount, average payment amount, usage peak hour, and usage off-peak hour of each of water, electricity, and gas in geographical location A in a specified period (for example, one month) |
| | Historical offline transaction information (offline information) of the geographical location | Historical average offline transaction amount (for example, offline transaction amount generated by using a POS machine) in geographical location A in a specified period |
| | Evaluation information (offline information) of the geographical location | User evaluation of geographical location A based on various predetermined indicators, for example, parking convenience, service quality, and commodity diversity |

TABLE 1-continued

| Feature | Information included in the feature | Information example |
|---|---|---|
| Population feature | Age distribution information of users in the geographical location | Population age distribution information of geographical location A (for example, percentage of people in each predetermined age group) |
| | Consumption feature information of users in the geographical location | Per capita consumption amount, per capita consumption frequency, and per capita consumption product category distribution (for example, percentage of a predetermined product category such as clothes, food, electronics, and appliances) in geographical location A in a specified period |

Certainly, in addition to the described information, each feature shown in Table 1 can further include other information provided that the information is obtained by the navigation server and the payment server through statistics collection. For example, the population feature can further include gender distribution information, occupation distribution information, or other relevant information of the users in the geographical location.

It is worthwhile to note that the behavior feature shown in Table 1 can be obtained through statistics collection by using historical data on the payment server. When the historical payment information of the geographical location is obtained through statistics collection, payment logs of water, electricity, and gas generated in the geographical location and stored on the payment server can be obtained, and then the average payment amount, the average usage amount, the peak hour, and the off-peak hour of electricity and gas in a specified cycle are calculated based on a payment amount, a usage amount, or a payment time etc. recorded in each log. When statistics collection is performed on the offline transaction information, a bank transfer record can be obtained by using the payment server, and an average transfer transaction amount in the geographical location in a specified period is determined based on the transfer record. When statistics collection is performed on the evaluation information, a user score for each indicator (for example, parking convenience) in the geographical location that is stored on the payment server can be obtained, and each average indicator score is calculated.

When statistics collection is performed on the population feature, a user, whose at least one receiving address is the geographical location, can be determined as a user in the geographical location based on a receiving address corresponding to each user account stored on the payment server. When statistics collection is performed on age distribution information of these users, age distribution of the users in the geographical location can be obtained through statistics collection based on user ages recorded in these user accounts stored on the payment server. For example, four age groups can be predetermined: 0-10, 10-20, 20-50, and 50-70. A user quantity in each age group is calculated, and a percentage of users in each age group in all users is calculated. When statistics collection is performed on the consumption feature information of the users in the geographical location, a total consumption amount, total consumption frequency, and consumption frequency of each type of products of each user in a specified period can be calculated based on a transaction record of each user in the period stored on the payment server, and consumption distribution of each type of products of each user is obtained through statistics collection based on the consumption frequency of each type of products of the user.

In addition, when statistics collection is performed on the population feature, the users in the geographical location can be divided by permanent resident features and non-permanent resident features, and statistics collection is separately performed on the two types of users. When the users are divided into the permanent resident users and the non-permanent resident users, a transaction record of each user stored on the payment server can be obtained. It is determined whether a quantity of or a percentage of transaction records including a receiving address being the geographical location exceeds a predetermined threshold; and if yes, the user is determined as the permanent resident user in the geographical location; otherwise, the user is determined as the non-permanent resident user in the geographical location.

The attribute information of the geographical location can be determined based on at least one of the geographical feature, the behavior feature, and the population feature after the three features are obtained through statistics collection by using the described method. A specific process is as follows:

Step 1: Obtain a score of each information included in each feature shown in Table 1, and predetermine an interval range for each information. Different interval ranges correspond to different scores. For example, as shown in Table 2, when the commercial value is determined, a score of a residential area is less than a score of a commercial area in the geographical feature because the commercial area is a concentrated consumption area including more restaurants, entertainment places, shopping malls, etc., but the residential area is only a concentrated residential area where a consumption amount and consumption frequency are far less than those in the commercial area. Therefore, the score of the commercial area is higher than the score of the residential area when the category information of the geographical location is determined.

TABLE 2

| Geographical location category | Category score |
|---|---|
| Commercial area | 99 |
| Tourist area | 90 |
| Office area | 80 |
| Residential area | 60 |

For another example, a population age score is similarly obtained in the population feature. As shown in Table 3, people aged from 0 to 10 cannot earn for a living on their own and are completely depend on parents, and therefore the consumption capability is low. People aged from 10 to 20 are mainly middle school and high school students provided with a small amount of pocket money by parents, and therefore a consumption capability is higher than 0 to 10 but still relatively low. People aged from 20 to 50 most have a job and a fixed income source, and therefore a consumption capability is high. People aged from 50 to 70 depending on children support and retirement pension are relatively frugal, and therefore a consumption capability is lower than people from 20 to 50. Therefore, consumption capabilities of the four age groups are ranked in descending order: 20-50, 50-70, 10-20, and 0-10, and scores of the consumption capabilities of the four age groups are correspondingly declining.

TABLE 3

| Age group | Consumption capability score |
|---|---|
| 20-50 | 95 |
| 50-70 | 70 |
| 10-20 | 50 |
| 0-10 | 15 |

TABLE 4

| Sample quantity | Integrity determining | Weight value |
|---|---|---|
| 900-1000 | Complete | 1 |
| 600-900 | Relatively complete | 0.7 |
| 300-600 | Relatively incomplete | 0.6 |
| 0-300 | Incomplete | 0.3 |

Step 2: Determine a weight of the information included in each of the geographical feature, the behavior feature, and the population feature. Authenticity and integrity of any information included in the geographical feature, the behavior feature, and the population feature are determined, and a weight of the information is determined based on the authenticity and the integrity of the information.

Because most data on the navigation server is collected through road collection, etc., and accuracy is relatively low in comparison with the payment server including real-time update changes, only authenticity of the geographical feature needs to be performed when the behavior feature and the population feature can be considered to be real. Therefore, when the authenticity of the geographical feature is determined, the authenticity of each information in the geographical feature can be determined by comparing the geographical feature with the behavior feature. For example, when authenticity of the "category information of the geographical location" in the geographical feature is determined, data obtained on the navigation server displays that geographical location A is a restaurant, but geographical location A is determined as a cinema after evaluation information or consumption feature information of geographical location A is analyzed (for example, a keyword in the evaluation information is extracted, or a consumption product category with maximum probability distribution in "consumption product category distribution" in a consumption feature is determined). Consequently, it can be determined that authenticity of "category information of geographical location A" in the geographical feature is very low, and an authenticity weight of the information is low or even 0. A specific authenticity quantization method can be as follows: A keyword in the geographical feature of geographical location A and a keyword in a behavior feature of geographical location A are extracted. For example, the keyword of the geographical feature includes taste, a serving speed, cleanliness, etc., and the keyword of the behavior feature includes audio and video, seats, fares, etc. Similarity calculation can be performed based on a natural language similarity determining algorithm. Higher similarity indicates a more real geographical feature and vice versa. In conclusion, for any information in any feature, higher information authenticity indicates a higher authenticity weight and vice versa.

The integrity can be determined by comparing a pre-estimated data volume with an actually obtained data volume. For example, a population consumption capability of geographical location A needs to be determined by calculating an average monthly consumption amount of 1000 people in geographical location A. In other words, the pre-estimated data volume is 1000. However, only an average monthly consumption amount of 700 people is obtained from the payment server. In other words, the actually obtained data amount is 700. Therefore, the information integrity can be obtained based on a pre-divided interval range shown in Table 4 of determining whether information is complete.

It is determined from Table 4 that the average monthly consumption amount is relatively complete information, and a corresponding weight value is 0.7.

Determining an information weight also depends on information importance in addition to information authenticity and integrity. For example, a restaurant is densely populated at a lunch time and a dinner time, and an average monthly transaction amount is relatively large, so that relatively large commercial value is given to a geographical location where parking is widely evaluated as convenient. Therefore, importance weights of the population distribution information at different time points in one day, the offline transaction amount information, and the evaluation information of geographical location A are higher than importance weights of other information included in the geographical feature, the behavior feature, and the population feature. An information importance weight can be artificially set as needed.

Step 3: Perform weighting calculation on the obtained scores, determine the attribute information of the geographical location, and provide the attribute information of the geographical location. Each information score is multiplied by an integrity weight, an authenticity weight, and an importance weight, and then a total weight score of all information is the commercial value of the geographical location.

Afterwards, the output commercial value of geographical location A can be provided for the navigation server, so that the commercial value of geographical location A is displayed on an electronic map provided by the navigation server for the user. Marking different colors on the map based on a commercial value degree helps the user to determine an urban commercial area. Or the output commercial value is provided for a credit service platform, so that the credit service platform determines, based on the commercial value of geographical location A, whether geographical location A has a repayment capability, and then performs a loan service. Or the output commercial value is provided for the user such as a small-/medium-sized business manager, to facilitate offline shop address selecting.

The attribute information of the geographical location can be determined by the payment server. Or another server can invoke the geographical feature from the navigation server, invoke the behavior feature and the population feature from the payment server, then perform weighting calculation, and eventually determine the attribute information of the geographical location.

Determining the commercial value of the geographical location is used as an example above for description. In addition to the commercial value of the geographical location, other attribute information of the geographical location can be further determined in the method shown in FIG. 1 in the present application, for example, entertainment density or catering density. The geographical feature, the behavior feature, and the population feature include different information when the catering density is determined. For example, when catering density of geographical location B is determined, a geographical feature of geographical location B can include a traffic congestion degree of the area at dining time, information about a distance between the area and a nearby commercial area, size information of the area, and a quantity of restaurants in the area. A behavior feature of geographical location B includes an average monthly purchase quantity of each of vegetables, meat, seafood, etc. of each restaurant in the area, an average daily diner quantity of each restaurant in the area, an average monthly usage amount of each of water, electricity, and gas of each restaurant in the area, an average monthly tax amount of each restaurant in the area, and an average daily opening hour of each restaurant in the area. A population feature of geographical location B includes a nearby population occupation, a gender ratio, age distribution, etc.

The method for determining attribute information of a geographical location according to an implementation of the present application is described above. Based on the same idea, as shown in FIG. 2, the present application further provides a corresponding device for determining attribute information of a geographical location.

Figure 2:
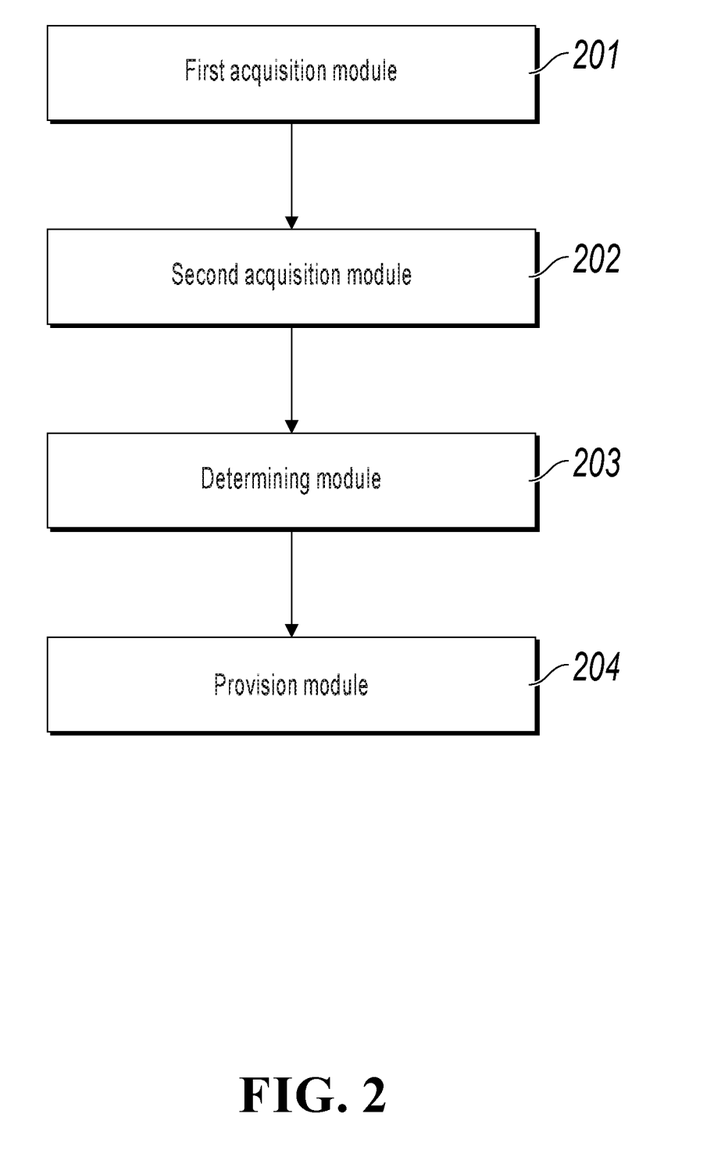
FIG. 2 is a schematic structural diagram illustrating a device for determining attribute information of a geographical location, according to an implementation of the present application.

FIG. 2 is a schematic structural diagram illustrating a device for determining attribute information of a geographical location, according to an implementation of the present application. The device includes the following: a first acquisition module 201, configured to obtain a geographical feature of a geographical location from a navigation server; a second acquisition module 202, configured to obtain a behavior feature and a population feature of the geographical location based on pre-stored historical data; and a determining module 203, configured to determine attribute information of the geographical location based on at least one of the geographical feature, the behavior feature, and the population feature.

The attribute information of the geographical location includes commercial value of the geographical location.

The geographical feature includes at least one of historical query frequency information of the geographical location, population distribution information of the geographical location, basic geographical information of the geographical location, and category information of the geographical location.

The behavior feature includes online information and offline information. The online information includes historical payment information of the geographical location. The offline information includes historical offline transaction information of the geographical location and evaluation information of the geographical location.

The population feature includes consumption feature information and age distribution information of users in the geographical location.

The determining module 203 is configured to obtain a score of information included in each of the geographical feature, the behavior feature, and the population feature; determine a weight of the information included in each of the geographical feature, the behavior feature, and the population feature; and perform weighting calculation on the obtained scores to determine the commercial value of the geographical location.

The determining module 203 is further configured to determine authenticity and integrity of any information included in the geographical feature, the behavior feature, and the population feature; and determine a weight of the information based on the authenticity and the integrity of the information.

The device further includes the following: a provision module 204, configured to provide the commercial value of the geographical location for the navigation server, so that the navigation server displays the commercial value of the geographical location on an electronic map provided for a user; or provide the commercial value of the geographical location for a credit service platform, so that the credit service platform performs a loan service based on the commercial value of the geographical location; or provide the commercial value of the geographical location for a user.

The device shown in FIG. 2 can be located on a server or a terminal device.

In typical configuration, a computing device includes one or more processors (CPU), an input/output interface, a network interface, and a memory.

The memory can include a non-persistent storage, a random access memory (RAM), a nonvolatile memory, and/or another form in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. A computer storage medium includes, but is not limited to, a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the definition in the present specification, the computer readable medium does not include transitory media, for example, a modulated data signal and carrier.

It is worthwhile to further note that the terms "include", "comprise", or their any other variants are intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk storage, a CD-ROM, and an optical memory) that include computer-usable program code.

The previous descriptions are merely implementations of the present application, and are not intended to limit the present application. For a person skilled in the art, the present application can have various modifications and changes. Any modifications, equivalent substitutions, improvements, etc. made in the spirit and principle of the present application shall fall in the scope of the claims in the present application.

Figure 3:
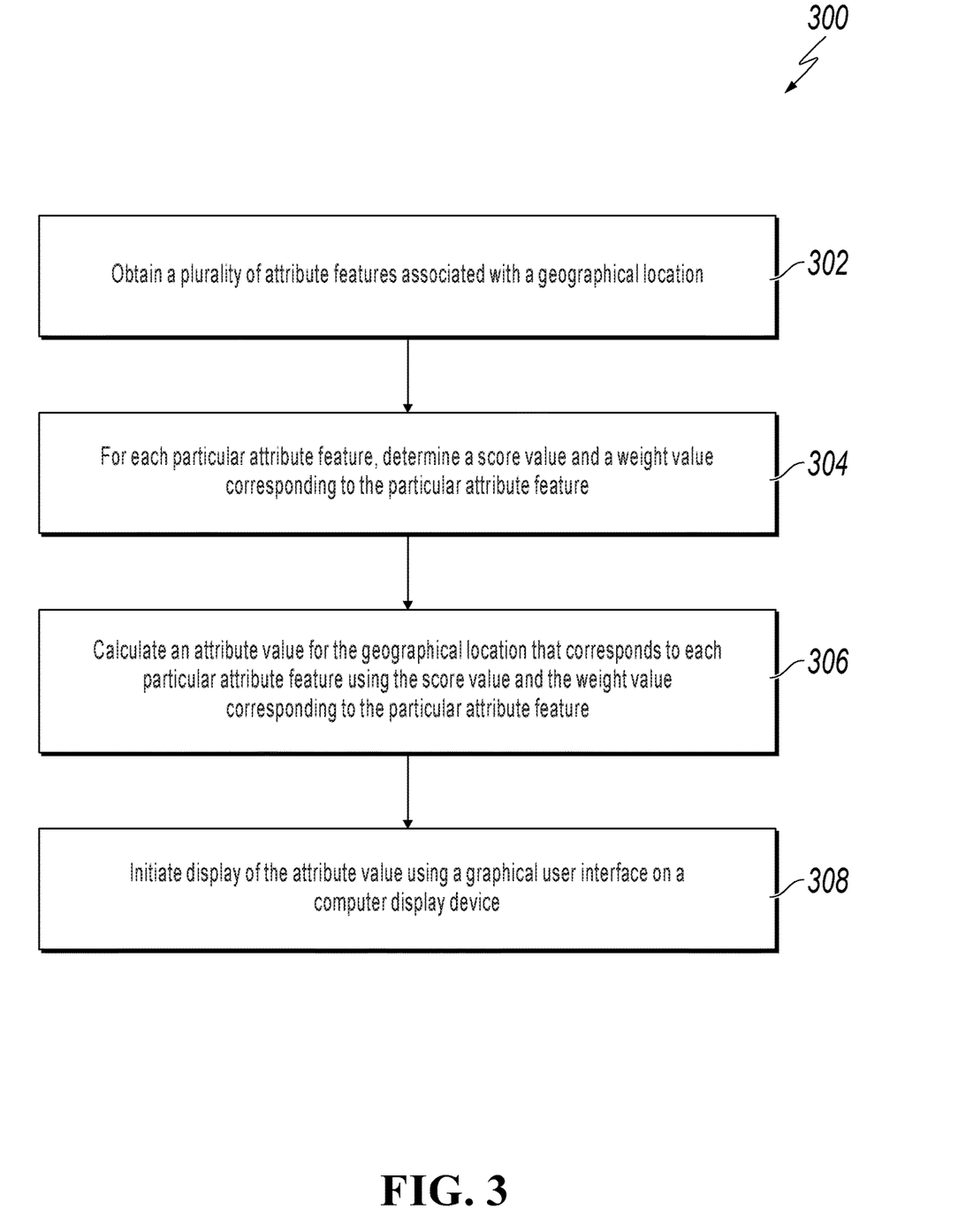
FIG. 3 is a flowchart illustrating an example of a computer-implemented method for determining attribute information of a geographical location, according to an implementation of the present disclosure.

FIG. 3 is a flowchart illustrating an example of a computer-implemented method 300 for processing computer data, according to an implementation of the present disclosure. For clarity of presentation, the description that follows generally describes method 300 in the context of the other figures in this description. However, it will be understood that method 300 can be performed, for example, by any system, environment, software, and hardware, or a combination of systems, environments, software, and hardware, as appropriate. In some implementations, various steps of method 300 can be run in parallel, in combination, in loops, or in any order.

At 302, at a terminal device, a plurality of attribute features associated with a geographical location are obtained, and the plurality of attribute features are determined based on geographical and residential information data of the geographical location that collected from more than one remote devices. In some implementations, the plurality of attribute features comprise one or more of a geographical feature, a behavioral feature, and or a population feature associated with the geographical location. From 302, method 300 proceeds to 304.

At 304, for each particular attribute feature, a score and a weight value corresponding to the particular attribute feature are determined. In some implementations, the score value of each particular attribute feature is determined based on a result of a comparison of the attribute feature of the geographical location with a corresponding attribute feature of another geographical location. In some implementations, the weight value of each particular attribute feature is determined by using an integrity weight value, an authenticity weight value and an importance weight value of the attribute feature. From 304, method 300 proceeds to 306.

At 306, an attribute value for the geographical location that corresponds to each particular attribute feature is calculated using the score value and the weight value corresponding to the particular feature. In some implementations, the attribute value for the geographical location is generated by obtaining the attribute value as an output of a pre-trained algorithm model, and the inputs of the pre-trained algorithm model are the plurality of attribute features. In some implementations, the attribute value for the geographical location is generated by performing a weighting calculation based on the score value and the weight value corresponding to each particular attribute feature. From 306, method 300 proceeds to 308.

At 308, display of the attribute value is initiated using a graphical user interface on a computer display device. In some implementations, the attribute value is calculated using a predetermined calculation method. In some implementations, display of the attribute value is initiated by providing the attribute value to a navigation server to be displayed for a user on an electronic map provided by the navigation server, or by providing the attribute value to a service platform for a service-associated determination; or by providing the attribute value to a user for an offline geographic location selection. After 308, method 300 stops.

Implementations of the present application can solve technical problems in determining an attribute value based on processing attribute-type data. Traditionally, to make a travel more convenient, map navigation software provides a traffic density map. Different colors are marked for different areas, such as densely populated and sparsely populated areas, so that a user can determine, based on the density map, whether an area is densely populated. However, it can be seen from the described process that the density map can only display population density instead of other attribute information of a geographical location, such as a level of prosperity, catering density, and entertainment density. If the user wants to obtain other attribute information of the area, the user is required to query other information. More operational steps mean less convenience for the user. What is needed is a technique to bypass these problems with conventional methods and to provide a more convenient and unified solution for determining an attribute value.

Implementations of the present application provide methods and apparatuses for improving data processing by determining an attribute value based on processing attribute data in a centralized location. According to these implementations, in addition to a location's geographical information, the present application also uses attribute information of people located in the geographical location. Further, to-be-processed attribute data is selected based on each end user's needs, thereby improving the efficiency and accuracy of the subsequent data processing and a final attribute value. Moreover, the attribute value associated with a geographical location is generated by using a predetermined calculation method (that is, a weighing calculation or through pre-trained algorithm model) for transforming, converting, or weighting the attribute data in the centralized location; resulting a more uniform attribute value. The centralized processing location can also be configured, for example, to save computer processing cycles, computer memory usage, and network bandwidth when compared to processing the described attribute-type data in multiple different locations and transmitting result data across a network(s) for subsequent processing to the centralized location.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method comprising:

obtaining, at a terminal device, a plurality of attribute features associated with a geographical location, wherein the plurality of attribute features are determined based on geographical and residential information data of the geographical location that is collected from one or more remote devices;

determining, for each particular attribute feature, a score value and a weight value of the particular attribute feature, wherein the weight value of the particular attribute feature is determined using an integrity weight value and an authenticity weight value, wherein the authenticity weight value is determined by comparing keywords in two or more attribute features based on a natural language similarity determining algorithm, wherein the integrity weight value is determined by comparing a pre-estimated consumption amount of an estimated population of the geographic location with an actual consumption amount of an actual population of the geographic location obtained from a payment server, the pre-estimated consumption amount of the estimated population having been determined prior to the actual consumption amount of the actual population obtained from the payment server;

calculating an attribute value for the geographical location that corresponds to the particular attribute feature using the score value and the weight value corresponding to the particular attribute feature;

providing, by the terminal device and to a navigation server, the attribute value for the geographical location;

receiving, by the terminal device and from the navigation server, an electronic map that includes the geographical location; and displaying, by the terminal device, the attribute value on the electronic map with respect to the geographical location.

2. The computer-implemented method of claim 1, wherein the score value of the particular attribute feature is determined based on a result of a comparison of the particular attribute feature of the geographical location with a corresponding attribute feature of another geographical location.

3. The computer-implemented method of claim 1, wherein the weight value of the particular attribute feature is further determined using the integrity weight value, the authenticity weight value, and an importance weight value of the particular attribute feature.

4. The computer-implemented method of claim 1, wherein calculating the attribute value for the geographical location comprises:
obtaining the attribute value as an output of a pre-trained algorithm model, wherein inputs of the pre-trained algorithm model are the plurality of attribute features; or
performing a weighting calculation based on the score value and the weight value corresponding to the particular attribute feature.

5. The computer-implemented method of claim 1, wherein the attribute value is calculated using a predetermined calculation method.

6. A non-transitory, computer-readable medium storing one or more instructions executable by a computer system to perform operations comprising:
obtaining, at a terminal device, a plurality of attribute features associated with a geographical location, wherein the plurality of attribute features are determined based on geographical and residential information data of the geographical location that is collected from one or more remote devices;
determining, for each particular attribute feature, a score value and a weight value of the particular attribute feature, wherein the weight value of the particular attribute feature is determined using an integrity weight value and an authenticity weight value, wherein the authenticity weight value is determined by comparing keywords in two or more attribute features based on a natural language similarity determining algorithm, wherein the integrity weight value is determined by comparing a pre-estimated consumption amount of an estimated population of the geographic location with an actual consumption amount of an actual population of the geographic location obtained from a payment server, the pre-estimated consumption amount of the estimated population having been determined prior to the actual consumption amount of the actual population obtained from the payment server;

calculating an attribute value for the geographical location that corresponds to the particular attribute feature using the score value and the weight value corresponding to the particular attribute feature;

providing, by the terminal device and to a navigation server, the attribute value for the geographical location;

receiving, by the terminal device and from the navigation server, an electronic map that includes the geographical location; and displaying, by the terminal device, the attribute value on the electronic map with respect to the geographical location.

7. The non-transitory, computer-readable medium of claim 6, wherein the score value of the particular attribute feature is determined based on a result of a comparison of the particular attribute feature of the geographical location with a corresponding attribute feature of another geographical location.

8. The non-transitory, computer-readable medium of claim 6, wherein the weight value of the particular attribute feature is further determined using the integrity weight value, the authenticity weight value, and an importance weight value of the particular attribute feature.

9. The non-transitory, computer-readable medium of claim 6, wherein calculating the attribute value for the geographical location comprises:
obtaining the attribute value as an output of a pre-trained algorithm model, wherein inputs of the pre-trained algorithm model are the plurality of attribute features; or
performing a weighting calculation based on the score value and the weight value corresponding to the particular attribute feature.

10. The non-transitory, computer-readable medium of claim 6, wherein the attribute value is calculated using a predetermined calculation method.

11. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, at a terminal device, a plurality of attribute features associated with a geographical location, wherein the plurality of attribute features are determined based on geographical and residential information data of the geographical location that is collected from one or more remote devices;
determining, for each particular attribute feature, a score value and a weight value of the particular attribute feature, wherein the weight value of the particular attribute feature is determined using an integrity weight value and an authenticity weight value, wherein the authenticity weight value is determined by comparing keywords in two or more attribute features based on a natural language similarity determining algorithm, wherein the integrity weight value is determined by comparing a pre-estimated consumption amount of an estimated population of the geographic location with an actual consumption amount of an actual population of the geographic location obtained from a payment server, the pre-estimated consumption amount of the estimated population having been determined prior to the actual consumption amount of the actual population obtained from the payment server;

calculating an attribute value for the geographical location that corresponds to the particular attribute feature using the score value and the weight value corresponding to the particular attribute feature;

providing, by the terminal device and to a navigation server, the attribute value for the geographical location;

receiving, by the terminal device and from the navigation server, an electronic map that includes the geographical location; and displaying, by the terminal device, the attribute value on the electronic map with respect to the geographical location.

12. The computer-implemented system of claim 11, wherein the score value of the particular attribute feature is determined based on a result of a comparison of the particular attribute feature of the geographical location with a corresponding attribute feature of another geographical location.

13. The computer-implemented system of claim 11, wherein the weight value of the particular attribute feature is further determined using the integrity weight value, the authenticity weight value, and an importance weight value of the particular attribute feature.

14. The computer-implemented system of claim 11, wherein calculating the attribute value for the geographical location comprises:

obtaining the attribute value as an output of a pre-trained algorithm model, wherein inputs of the pre-trained algorithm model are the plurality of attribute features; or performing a weighting calculation based on the score value and the weight value corresponding to the particular attribute feature.

15. The computer-implemented system of claim 11, wherein the attribute value is calculated using a predetermined calculation method.

16. The computer-implemented method of claim 3, wherein the weight value of the particular attribute feature corresponds to a commercial value of the geographical location.

17. The non-transitory, computer-readable medium of claim 8, wherein the weight value of the particular attribute feature corresponds to a commercial value of the geographical location.

18. The computer-implemented system of claim 13, wherein the weight value of the particular attribute feature corresponds to a commercial value of the geographical location.

* * * * *